United States Patent Office 3,539,577
Patented Nov. 10, 1970

3,539,577
ISOQUINOLINE CARBOXAMIDES
Martin A. Davis, Montreal, Quebec, and Leslie G. Humber, Dollard des Ormeaux, Montreal, Quebec, Canada, assignors to American Home Products Corporation, New York, N.Y., a corporation of Delaware
No Drawing. Filed July 17, 1967, Ser. No. 653,629
Int. Cl. C07d 39/00
U.S. Cl. 260—287       2 Claims

ABSTRACT OF THE DISCLOSURE

There are disclosed herein the antibacterial, antifungal, trichomonacidal and anticonvulsant 2-α-acetamide, 2-β-propionamide, and 2-γ-butyramide derivatives of 1,2,3,7,8,12β - hexahydrobenzo - [1,2]cyclohepta[3,4,5-d,e]isoquinoline, the intermediate nitriles for preparing those compounds, and methods for preparing and using them.

---

This invention relates to novel chemical compounds having useful biological properties. More particularly this invention relates to novel carboxamides of the following general Formula I:

(I)

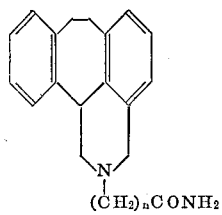

(CH$_2$)$_n$CONH$_2$ where $n$ represents an integer of from zero to four. In the case where $n$ represents zero it is understood that the methylene group CH$_2$ is absent and that the carboxamide group, CONH$_2$, is attached directly to the nitrogen atom of the heterocyclic ring.

The novel compounds of Formula I may be prepared from the parent heterocyclic ring, namely 1,2,3,7,8,12b-hexahydrobenzo - [1,2]cyclohepta[3,4,5-d,e]-isoquinoline of Formula II, which is itself prepared as described in J. Heterocyclic Chem. 3, 247 (1966). Thus the compound of Formula II is converted to the corresponding-N-cyanoalkyl compound of Formula III by treatment with an appropriately substituted nitrile of the formula X(CH$_2$)$_n$CN where $n$ is an integer of from 1–4 and X represents a group capable of interactions with an amine such as, for example, a halogen atom. In the particular case where $n=1$, one may advantageously use glycolonitrile,

HOCH$_2$CN which furnishes the desired cyanomethyl compound. The reaction is advantageously carried out in a suitably inert solvent such as, for example, aqueous ethanol. The product is isolated and purified in the conventional manner and is then converted to the carboxamido compound of Formula I by hydrolysis of the nitrile group. In a preferred process the compound of Formula III is treated with polyphosphoric acid and heated at an elevated temperature of from 110 to 130° C. The cooled mixture is then diluted with water, neutralized with alkali and the product is isolated and purified in the conventional manner.

The compounds of Formula I in which $n$ is zero may be prepared from the parent heterocycle of Formula II by treatment with phosgene. The reaction is carried out in a suitably inert solvent such as, for example, benzene and at an elevated temperature in the range of from 60 to 80°. This serves to furnish the corresponding N-chlorocarbonyl compound of Formula IV which is then treated with a molar excess of ammonia to furnish the desired carboxamide. This same compound may be prepared directly from the parent heterocycle by treatment with an alkali metal cyanate in an organic acid. In a preferred process sodium cyanate in aqueous acetic acid at room temperature is used and the carboxamide is isolated and purified in the conventional manner.

The compounds of Formula I have antibacterial and antifungal effects against certain pathogenic microorganisms such as, for example, *Staphylococcus pyogenes*, both penicillin sensitive and penicillin resistant strains, *Sarcina lutea*, *Streptococcus fecalis*, *Escherichia coli*, *Aerobacter aerogenes*, *Salmonella pulmorum*, *Pseudomonas aeruginosa*, *Proteus mirabilis*, and *Proteus vulgaris*, and are antibacterial and antifungal agents. For this use they may be formulated with suitable excipients as lotions, ointments or creams containing from 0.1 to 2.0% of the active ingredient. Such dosage forms may be administered topically to infected areas of the skin several times daily. The compounds also possess trichomonacidal activity aganst *Trichomonas foetus* and *Trichomonas vaginalis* and are trichomonacidal agents. For such purpose they may be formulated with suitable excipients in the form of vaginal inserts or vaginal suppositories each containing from 50 to 500 mg. of the active ingredient. Such dosage forms may be administered two or three times daily for periods of time of from two to several weeks. The compounds of this invention also protect mammals against the effects of experimentally applied electroshock, and as anticonvulsant agent they elicit this effect at doses well below those causing toxicity. They may be formulated in tablets or capsules each containing from 25–100 mg. of the active ingredient and may be administered as required.

The following formulae and descriptive examples will illustrate this invention, but are not construed to limit it thereto. The compositions of all compounds described are identified by elemental analysis.

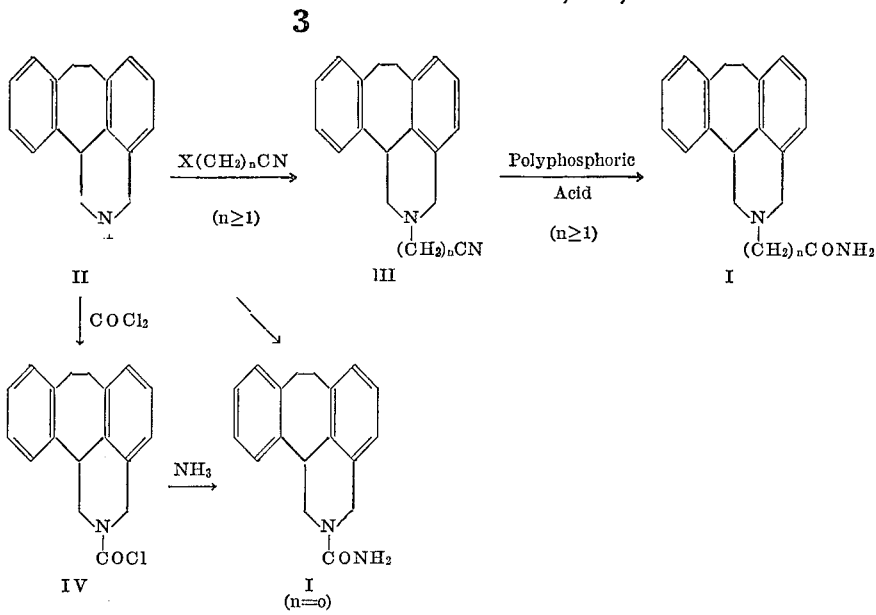

EXAMPLE 1

2-cyanomethyl-1,2,3,4,7,8,12b-hexahydrobenzo-
[1,2]cyclohepta[3,4,5-d,e]isoquinoline To 1,2,3,7,8,12b - hexahydrobenzo[1,2]cyclohepta[3,4,
5-d,e]isoquinoline (23.5 g., 0.1 mole) in absolute ethanol
are added dropwise, with stirring, 70% aqueous glycolonitrile (16.4 g., 0.2 mole). The mixture is heated under
reflux and stirred for 2 hours. The cream-coloured precipitated product is collected by filtration, washed with a
little cold ethanol and dried to furnish the title compound
with M.P. 119–121° C. after recrystallization from ethanol acetate-hexane.

In the same manner, but using γ-bromopropionitrile or
γ-bromobutyronitrile instead of glycolonitrile, in the presence of a basic condensing agent, the corresponding 2-cyanoethyl and 3-cyanopropyl analogs of the title compound are also obtained.

EXAMPLE 2

1,2,3,7,8,12b-hexahydrobenzo[1,2]cyclohepta-[3,4,5-d,e]
isoquinoline-2-α-acetamide The 2-cyanomethyl derivative obtained as described in
Example 1 is stirred and heated at 120° in polyphosphoric
acid for 3 hours. Water is cautiously added to the mixture
and the solution made alkaline with sodium hydroxide solution. After extraction with chloroform, the organic
layer is washed with water and the solvent dried over sodium sulfate. Removal of the solvent in vacuo yields the
title compound with M.P. 202–204° C. after recrystallization from ethanol.

In the same manner, by substituting the 2-cyanoethyl
and 3-cyanopropyl analogs obtained as described in Example 1 for the 2-cyanomethyl derivative, the corresponding 2-β-propionamide and 2-γ-butyramide analogs of the
title compound are also obtained.

EXAMPLE 3

1,2,3,7,8,12b-hexahydrobenzo[1,2]cyclohepta-[3,4,5-d,e]
isoquinoline-2-carboxamide To 1,2,3,7,8,12b - hexahydrobenzo[1,2]cyclohepta[3,4,
5-d,e]isoquinoline (6.0 g., 0.025 mole) in anhydrous benzene (70 ml.) is added phosgene gas in a slow stream for
two hours, while maintaining the mixture under reflux.
After cooling, hexane is added to precipitate the intermediate carbamoyl chloride which is obtained with M.P.
125–126° C. after recrystallization from high boiling petroleum ether.

The carbamoyl chloride is converted to the corresponding 2-carboxamide by treatment with liquid ammonia in
a citrate pressure bottle overnight. The title product is obtained with M.P. 206–208° C. (dec.) after recrystallization from ethanol-ether.

To a solution of 1,2,3,7,8,12b-hexahydrobenzo[1,2]-cyclohepta[3,4,5-d,e]isoquinoline (4.7 g., 0.02 mole) 50%
acetic acid (200 ml.) is added dropwise with stirring, a
solution of sodium cyanate (2.6 g., 0.04 mole) in water
(20 ml.). The solution is stirred at room temperature for
18 hours. Water is added to the solution and the aqueous
phase is extracted with chloroform. The combined chloroform extracts are washed with sodium bicarbonate and
water dried, evaporated to give a residue which yields the
ethanol-ether.

We claim:
1. 1,2,3,7,8,12b - hexahydrobenzo[1,2]cyclohepta-[3,4,
5-d,e]isoquinoline-2-α-acetamide.
2. 1,2,3,7,8,12b - hexahydrobenzo[1,2]cyclohepta-[3,4,
5-d,e]isoquinoline-2-carboxamide.

References Cited

UNITED STATES PATENTS

| 3,245,997 | 4/1966 | Yonan | 260—288 |
| 3,294,802 | 12/1966 | Skau et al. | 260—287 X |
| 3,404,145 | 10/1968 | Skau et al. | 260—287 X |

OTHER REFERENCES

Fieser et al.: "Advanced Organic Chemistry," Reinhold, 1951, p. 519.

Humber et al.: Jour. Hetero. Chem. vol. 3, pp. 247–51 (1966).

DONALD G. DAUS, Primary Examiner

U.S. Cl. X.R.

260—465.6, 465.7; 424—258